United States Patent
Pelle et al.

(10) Patent No.: US 9,696,715 B2
(45) Date of Patent: Jul. 4, 2017

(54) METHOD OF PROTECTING REDUNDANT SERVERS COUPLED TO A MANUFACTURING EXECUTING SYSTEM

(71) Applicant: SIEMENS AKTIENGESELLSCHAFT, Munich (DE)

(72) Inventors: Frederic Pelle, Toulouse (FR); Olivier Rambeau, Villeneuve (FR); Nuno Rodrigues Castanheira, Labege (FR)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 14/709,665

(22) Filed: May 12, 2015

(65) Prior Publication Data
US 2015/0334183 A1 Nov. 19, 2015

(30) Foreign Application Priority Data
May 16, 2014 (EP) .................... 14 290 146

(51) Int. Cl.
*G06F 15/16* (2006.01)
*G05B 19/418* (2006.01)
*H04L 29/14* (2006.01)

(52) U.S. Cl.
CPC ............. *G05B 19/4185* (2013.01); *G05B 2219/31372* (2013.01); *G05B 2219/34263* (2013.01);
(Continued)

(58) Field of Classification Search
CPC ..................................... H04L 69/40
(Continued)

(56) References Cited

U.S. PATENT DOCUMENTS 7,003,558 B2   2/2006   Agrusa et al.
7,372,819 B2   5/2008   Martin
(Continued)

FOREIGN PATENT DOCUMENTS

EP   1121626 B1   3/2004
EP   2048816 A1   4/2009
WO   02103961 A1  12/2002

OTHER PUBLICATIONS

Anonymous: "OPC DataHub Manual"; retrieved on Nov. 11, 2014 from the Internet: URL:http://www.opcdatahub.com/Download/pdfRelease/OPCDataHub-6.4-100301-PDF.zip; pp. 1-229; XP055152180; 2014.
(Continued)

*Primary Examiner* — Adnan Mirza
(74) *Attorney, Agent, or Firm* — Laurence Greenberg; Werner Stemer; Ralph Locher

(57) ABSTRACT

A method protects at least two redundant servers. The redundant servers act as main and shadow interfaces between respectively at least two redundant process servers coupled to a manufacturing execution system and at least two redundant control servers coupled to an automation part. Each of the servers is configured to receive automation data from each of the redundant control servers. A time of receipt and a tag are extracted from the automation data and are registered in a database coupled with the servers. If one of the tags is registered within a predefined delay after the time of receipt of the other tag, the server with the older time of receipt is set up as the main interface and the other server is set up as the shadow interface.

2 Claims, 2 Drawing Sheets

(52) U.S. Cl.
CPC ............... *H04L 69/40* (2013.01); *Y02P 90/10* (2015.11); *Y02P 90/12* (2015.11); *Y02P 90/18* (2015.11)

(58) Field of Classification Search
USPC ........................................... 709/202; 700/13
See application file for complete search history.

(56) References Cited

U.S. PATENT DOCUMENTS

| | | | |
|---|---|---|---|
| 2005/0278053 A1* | 12/2005 | Chia ................. | G05B 23/0227 700/110 |
| 2010/0005336 A1 | 1/2010 | Jordan et al. | |
| 2012/0117416 A1* | 5/2012 | McLaughlin ....... | G06F 11/1658 714/4.11 |

OTHER PUBLICATIONS

OPC Foundation—"OPC Unified Architecture Specification Part:1 Overview and Concepts, Release 1.01" URL: https://www.opcfoundation.org/Downloads.aspx/UnifiedArchitecture/OPCUAPart1-OverviewandConepts1.01Specification.zip?RI=414>; pp. 1-20; 2009.

OPC Foundation; "OPC Unified Architecture Specification—Part 4: Services—Release Candidate 1.01.30"; Internet Citation; retrieved on 15.08.14 from the Internet: URL:http://web24267.5udns.cn/attachment.aspx?attachmentid=658; pp. I-XIII; XP002728532; 2008.

* cited by examiner

METHOD OF PROTECTING REDUNDANT SERVERS COUPLED TO A MANUFACTURING EXECUTING SYSTEM

CROSS-REFERENCE TO RELATED APPLICATION

This application claims the priority, under 35 U.S.C. §119, of European application EP 14 290 146.1, filed May 16, 2014; the prior application is herewith incorporated by reference in its entirety.

BACKGROUND OF THE INVENTION

Field of the Invention

The present invention relates to a method of protecting redundant servers coupled to a manufacturing executing system (MES).

A method for managing and controlling manufacturing and/or analysis processes planned by an enterprise resource planning (ERP) and produced by a technical process line, provides in the environment of a manufacturing executing system (MES) an automation (or batch) system for implementing the planned analysis processes and controlling the corresponding workflow steps at the level of the technical process line.

In particular, the enterprise resource planning (ERP) is a system including hardware devices and corresponding software applications for planning the business resources of an enterprise, i.e. material provisions, human resource managements, purchasing, orders, profits, finance, inventory controls, customer managements, etc., while the term "technical process line" refers to a system supporting the control of single machines involved in the analysis processes, for example by measuring the number of pieces handled per hour by each machine or the functioning parameters thereof, the quality of the analysis results and so on.

MES is an intermediate layer providing computing machines and software tools between the ERP upper layer and the process line lower layer, including a software tool for analysis management, which receives requests of analysis from the ERP, and a software tool for productive process, which supports the phases of selecting and managing the resources to be involved in the productive processes, i.e. employees, machines and materials, in order to realize a planned analysis process within required time constraints.

MES is based on the International Standard Association (ISA) standard S95 which defines how software tools may implement the productive process at a plant floor level and how to communicate with it. Beside the productive process itself, it is crucial for many industries to control the productive process in terms of analysis, measurements and traceability of the products, like for example for pharmaceutical industry, food industry, high-tech industry, or for industries where the productive process itself is a process of analyzing a sample, i.e. medical diagnostic analysis, material science analysis, drug scanning and so on.

A batch system is an automation system part of the lower layer. A batch system provides computing machines and software tools to drive and monitor pieces of equipment at the plant floor level. A batch system contains a set of basic recipes, which defines steps for driving a piece of equipment in order to realize a given basic task. In other words, the batch system controls actuators—like so called programmable logic controller (PLC) units of a piece of equipment in order to perform a given task at the plant floor level.

FIG. 1 presents a schematic overview of an interface between a MES and a batch system PLC containing a plurality of PLC units. Sequentially the MES is coupled to at least two redundant process servers PI1, PI2, the process servers being coupled with at least two redundant servers EPE1, EPE2 (=as Element Procedural Elements servers), the servers EPE1, EPE2 acting as main and shadow interfaces between respectively the at least two redundant process servers PI1, PI2 and at least two redundant control servers OPC1, OPC2 (as Operational Process Control OPC-servers according to known OLE-technology: the OPC Specification was based on the OLE, COM, and DCOM technologies developed by Microsoft® for the Microsoft Windows® operating system family. The specification defined a standard set of objects, interfaces and methods for use in process control and manufacturing automation applications to facilitate interoperability, the servers OPC1, OPC2 being coupled to an automation part containing the batch system PLC with its controllers 1, 2, 3. In other words the interface between the MES and the batch system PLC contains hence at least two redundant data paths in case one of the servers would be defect. In the example of FIG. 1 it is assumed that the path PI1, EPE1, OPC1 is considered as a main path and the other path PI2, EPE2, OPC2 as a shadow path. Principally both main and shadow path transmit the same information between the MES and the batch system PLC. In case e.g. the server EPE1 in the main path is defect, the server EPE2 in the redundant shadow path will take over the lead of the transmission to guaranty the protection of the transmission. Other crossed protection paths (see vertical and oblique arrows) between servers of each one of the main and shadow (horizontal) paths are also possible in order to permanently ensure at least one secure transmission between the MES and the batch system PLC.

Such a management of redundancy of servers is however impacted with long time delay due to a detection of failure by one server. In other words at the side of the batch system the productivity of the plant floor will be slower by such a detection which is principally based on also varying values of automation data.

There is therefore a need to improve—in terms of time and robustness—the detection of failure of servers for a system as presented in FIG. 1, especially if one of the at least two redundant servers EPE1, EPE2 (Element Procedural Elements servers) fails.

SUMMARY OF THE INVENTION

It is accordingly an object of the invention to provide a method for protecting redundant servers coupled to a MES that overcomes the above-mentioned disadvantages of the prior art methods of this general type.

For this purpose the present invention proposes a method of protecting at least two redundant servers. The servers acting as main and shadow interfaces between respectively at least two redundant process servers coupled to a manufacturing execution system (MES) and at least two redundant control servers coupled to an automation part. Each of the servers is configured to receive at least automation data from each of the redundant control servers. A time of receipt and a tag are extracted from the automation data and are registered in a database coupled with the servers. A detection process of a failure is performed in real-time within the database by analyzing the times of receipt of each tag of the redundant automation data. If one of the tags is registered within a predefined delay after the time of receipt of the other tag, the server with the older time of receipt is setup as the main interface and the other server is setup as the shadow interface.

Furthermore according to the invention, if one of the tags is registered later than the predefined delay after the time of receipt of the other tag, the server with the previous time of receipt is setup as the main interface and the other server is setup as the shadow interface.

The check on times of receipt for each redundant tags presents the main advantage that a check is no longer performed on a value of the automation data. This is a major point for such MES because principally the values of such automation data contain two kinds of data for controlling or testing back the batch system:
0 or 1 binary values (like for opening/closing a valve, etc.); and
curves (like for a pH, a temperature, etc.).

At the same time, at least two EPE servers are running, one as the main server and the other(s) as the shadow server(s). In the present manner, all the servers retrieve automation data, and store them to buffers, to compare them.

However in automation, it can be quite impossible to compare different values of automation data that such servers receive. For example in a curve mode as previously mentioned, the values received by the different servers could not be the same. For example, a curve of temperature wherein the temperature increases, the first server receives 102.4°, and the second one receives 102.9° because of a delaying at the measurement, at the transmission side or even at the servers. Due to this value deviation, it is hence not possible to use a sharp comparison for checking if two EPE-servers receive the same value or not.

Due to the fact that the method according to the invention avoids detection based on values from the automation data, such kind of detection weakness is avoided.

The method also allows to advantageously avoid a slowdown and even an interruption of productivity by the detection step of a failure because of the continuous behavior of checking only each of the time of receipt for each redundant tag. Consequently the switch between the main and shadow interfaces or EPE-servers can also be performed in a continuously manner.

Other features which are considered as characteristic for the invention are set forth in the appended claims.

Although the invention is illustrated and described herein as embodied in a method for protecting redundant servers coupled to a MES, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
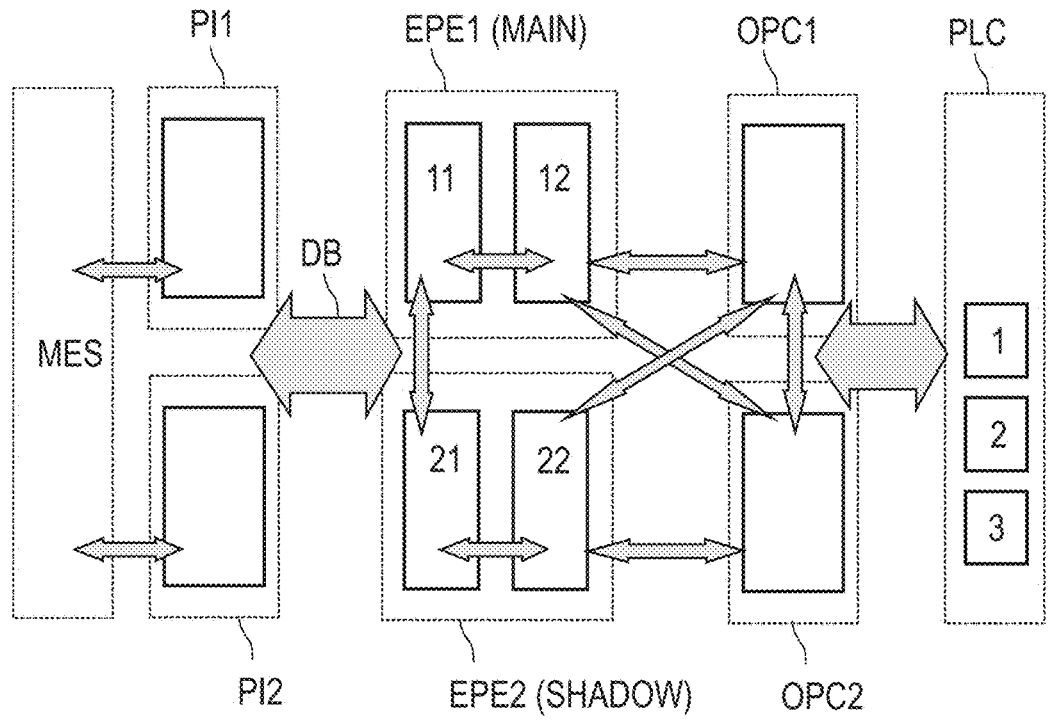
FIG. 1 is a block diagram of an interface between a MES and a batch system PLC containing a plurality of PLC units.
Figure 2:
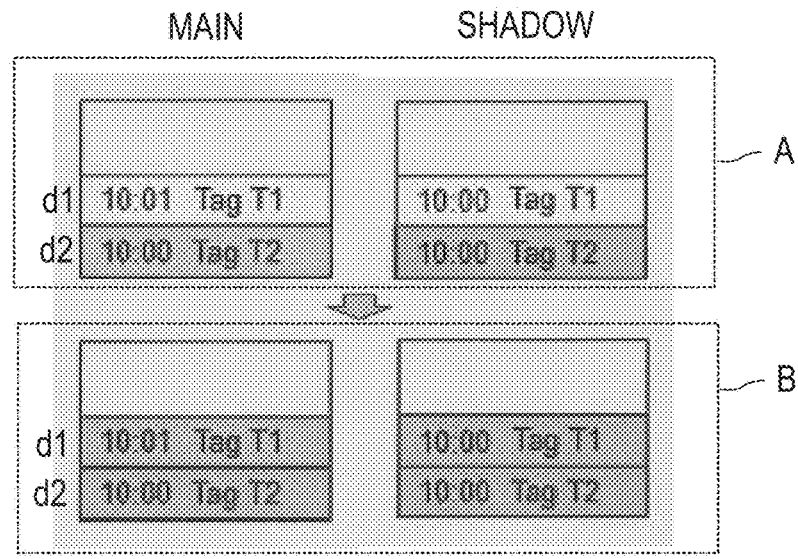
FIG. 2 is an illustration showing how a main server receives newer automation data then a shadow server.
Figure 3:
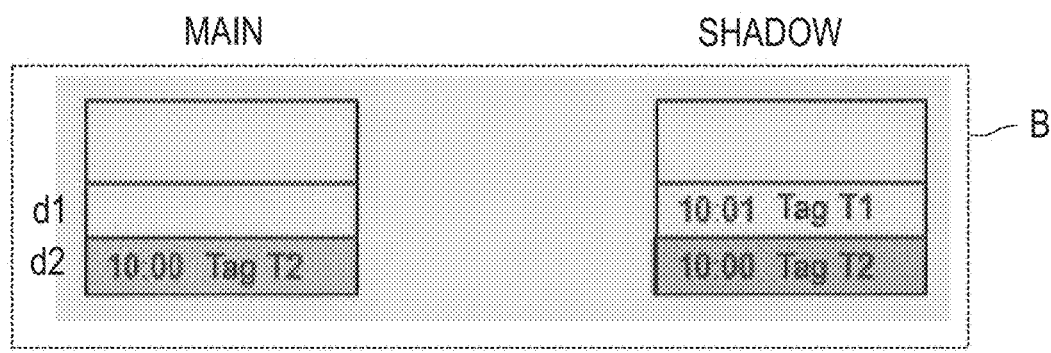
FIG. 3 is an illustration showing that the main server does not receive any automation data.
Figure 4:
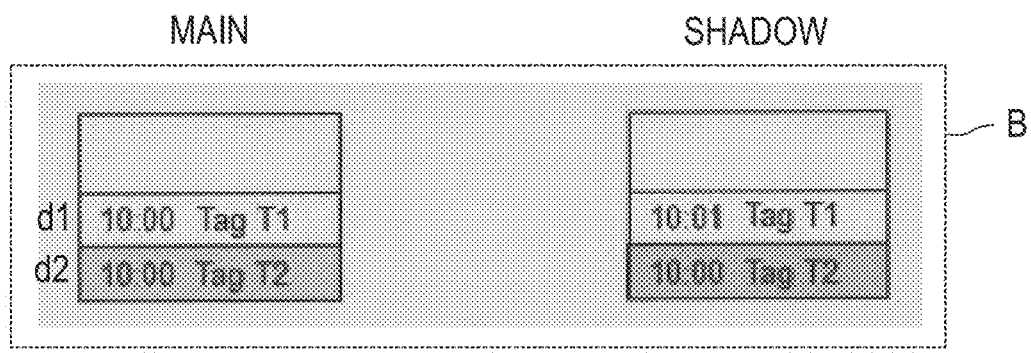
FIG. 4 is an illustration showing how the shadow server receives newer automation data then the main server.

Referring now to the figures of the drawings in detail and first, particularly to FIGS. 2-4 thereof, there is shown a schematic analysis within a database DB according to the system shown in FIG. 1, in the case of a failure by the redundant EPE-servers EPE1, EPE2 (each one containing serial coupled EPE-servers 11, 12 and 21, 22).

Principally according to FIG. 1 and to one of the FIGS. 2-4 the present invention focuses on a method of protecting at least two redundant servers (EPE1, EPE2), the servers acting as the main and shadow interfaces between respectively at least two redundant process servers (PI1, PI2) coupled to a manufacturing execution system (MES) and at least two redundant control servers (OPC1, OPC2) coupled to an automation part (PLC). Wherein each of the servers (EPE1, EPE2) are configured to receive automation data from each of the redundant control servers (OPC1, OPC2). A time of receipt (d1, d2) and a tag (T1, T2) are extracted from the automation data and are registered in a database coupled with the servers (EPE1, EPE2). A detection process of a failure is performed in real-time within the database by analyzing the times of receipt (d1, d2) of each tag (T1, T2) of the redundant automation data. If one of the tags (T1, T2) is registered within a predefined delay after the time of receipt of the other tag, the server with the older time of receipt is setup as the main interface and the other server is setup as the shadow interface.

Analogically if one of the tags (T1, T2) is registered later than the predefined delay after the time of receipt of the other tag, the server with the previous time of receipt is setup as the main interface and the other server is setup as the shadow interface.

FIG. 2 represents the first case in that the main server EPE1 (MAIN)—in fact this data is received in a buffer at a database correlated to the server—receives newer automation data then the shadow server EPE2 (SHADOW) according to FIG. 1. Here this is detected in two steps A, B (for the redundant receipt of two following tags T1, T2 at each of the main and shadow servers) by the detection of a newer time of receipt d1 (10:01) for the (last) tag T1 at the main server than the time of receipt (10:00) of the same tag at the shadow server. The detection is also pending within the predefined delay for ensuring a detection end per default. The main server EPE1 (MAIN) is hence free of any failure and there is no need to switch a data transmission on a redundant path, like over the shadow server EPE2 (SHADOW).

FIG. 3 (on the same principal as FIG. 2) represents the second case in that the main server EPE1 (MAIN) does not receive any more automation data as the shadow server EPE2 (SHADOW) receives. This is detected due to the fail state of a coming tag T1 and consequently over the fail state of a time of receipt d1 the corresponding tag at the main server EPE1 (MAIN). As well the fail state of time of receipt d1 results in a delaying over the predefined delay which is set to avoid any endless detection. At this stage the shadow server EPE2 (SHADOW) can replace the main server EPE1 (MAIN) without interruption and loss of any data.

FIG. 4 (on the same principal as FIG. 2 or 3) represents the third case in that shadow server EPE2 (SHADOW) receives newer automation data then main server EPE1 (MAIN). This case is more complex because it does not mean that the main server has a failure EPE1 (MAIN)

because the automation data was received on both the main and shadow sides within the predefined time delay. Anyway it can be managed in the following manner:
if within the predefined delay no change of the received tags T1, T2 occurs in the main or the shadow server, the main server stays as the main one;
if within the predefined delay the main server receives a change of tag T1 to T2 after the same tag in the shadow server, see and apply the process described by FIG. 2; and
if within the predefined delay the shadow server receives a change of tag after the same tag in the main server, see the process described by FIG. 3 or 4.

The invention claimed is:

1. A method for protecting at least two redundant servers, the redundant servers acting as main and shadow interfaces between respectively at least two redundant process servers coupled to a manufacturing execution system and at least two redundant control servers coupled to an automation part, which comprises the steps of:

configuring each of the redundant servers to receive automation data from each of the redundant control servers;

extracting a time of receipt and a tag from each of the automation data and registering times of receipt and tags in a database coupled with the redundant servers; and setting one of the redundant servers to function as the main interface and another one of the redundant servers to function as the shadow interface dependent on a time of receipt of the automation data, wherein the one of the redundant servers having the automating data with an older time of receipt is set to function as the main interface and the other one of the redundant servers is set to function as the shadow interface, if one of the tags is registered within a predefined delay after the time of receipt of the other tag.

2. The method according to claim 1, wherein if one of the tags is registered later than the predefined delay after the time of receipt of the other tag, the one of the redundant servers with a previous time of receipt is set to function as the main interface and the other one of the redundant servers is set to function as the shadow interface.

* * * * *